United States Patent Office 3,002,089
Patented Sept. 26, 1961

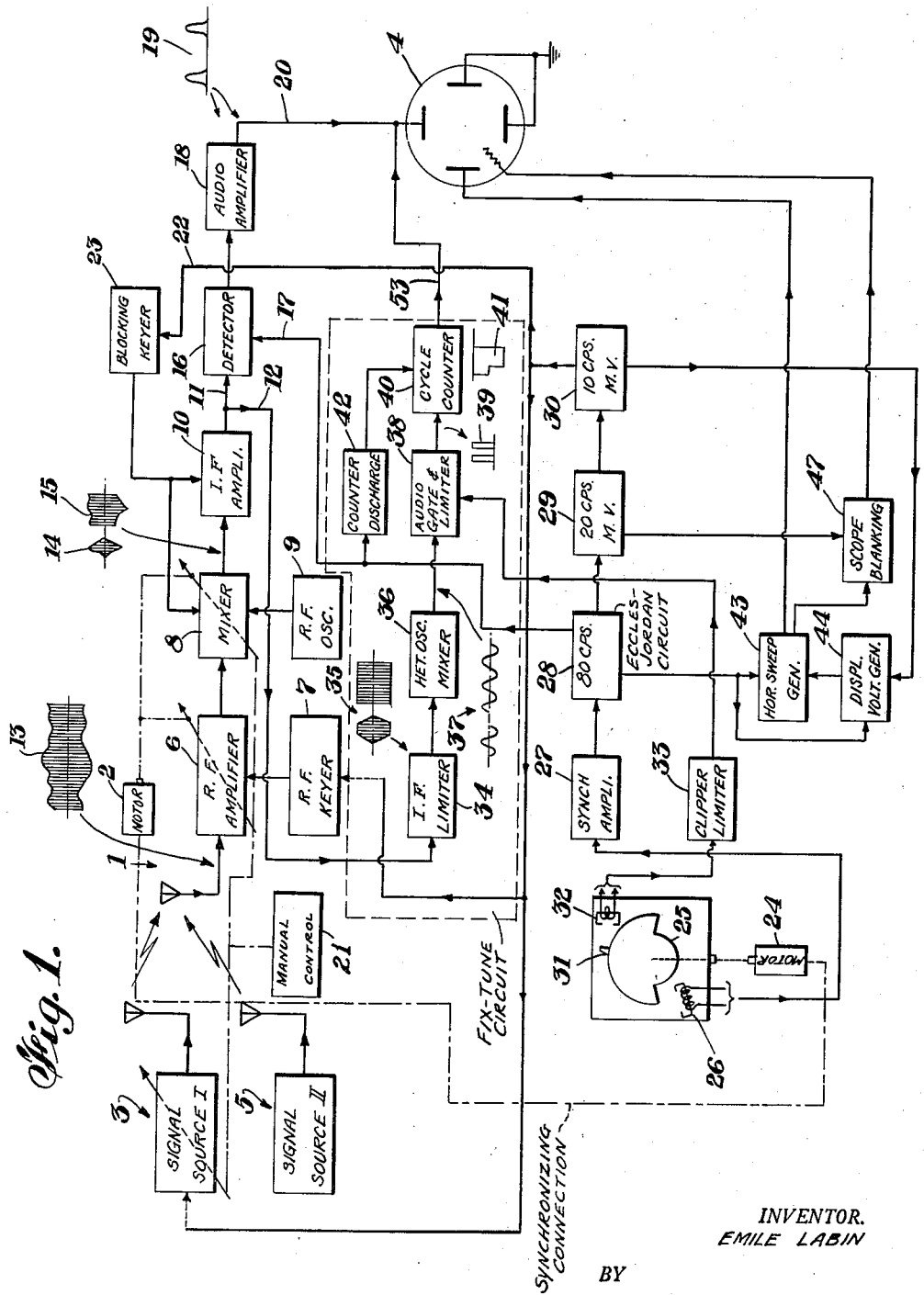

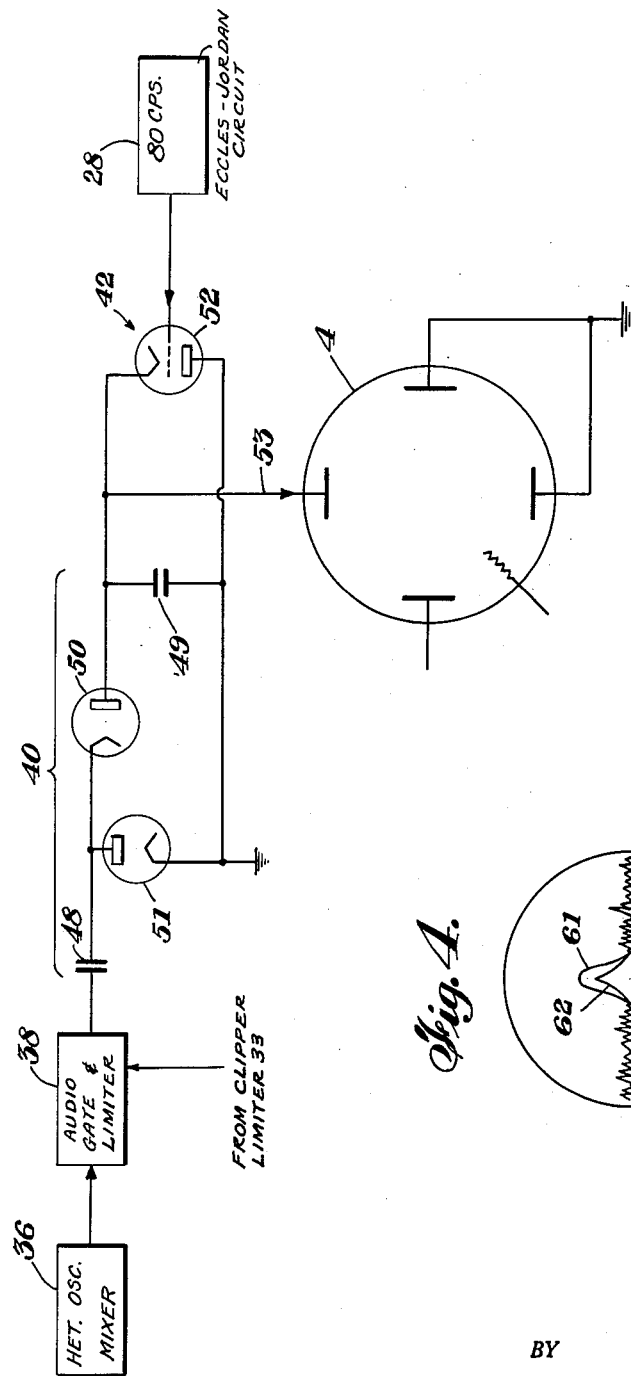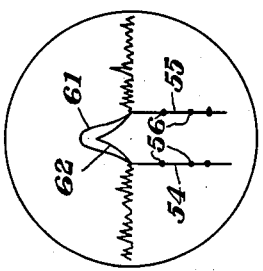

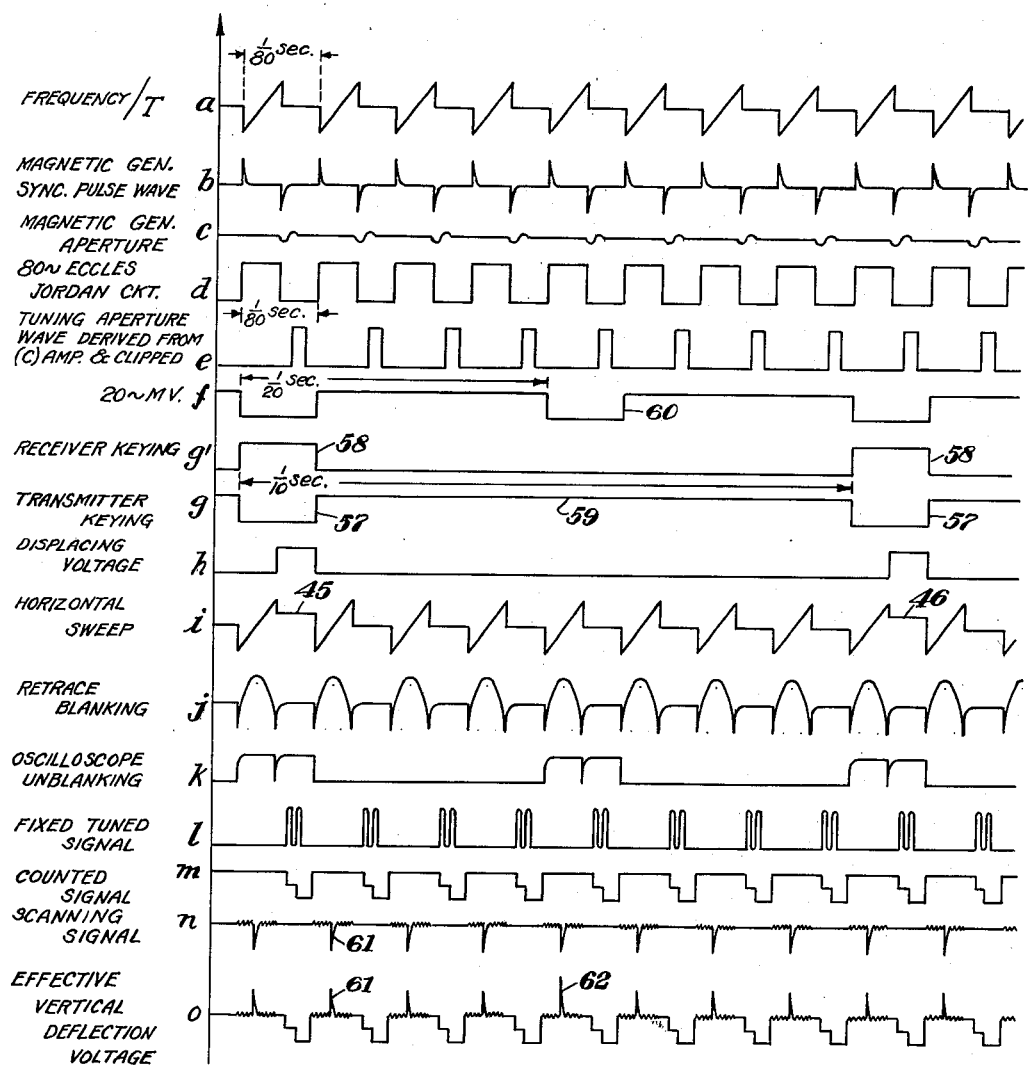

3,002,089
METHOD AND APPARATUS FOR ACCURATE
COMPARISON OF FREQUENCIES
Emile Labin, New York, N.Y., assignor to International
Telephone and Telegraph Corporation, a corporation
of Maryland
Filed Sept. 16, 1944, Ser. No. 554,408
5 Claims. (Cl. 250—20)

This invention relates to radio systems and more particularly to radio systems for comparing the signal frequencies from particular stations.

It is frequently desired to ascertain the frequency of a given signal source and subsequently to duplicate this frequency by another signal source. This problem requires a convenient mode for comparing the frequency of the given signal with the other signal source. Many applications will come to mind where the comparison of frequencies is useful, particularly in the field of communications, one such application being the interception of and interference with outside radio signalling in various forms, as exemplified by jamming of enemy signals in wartime. For this purpose systems which are generally usable in communication practice have been proposed wherein a receiving station is tuned over a band of frequencies in order to locate given transmitting stations as to frequency of broadcast or transmission. After such transmitting stations have been found, signals are transmitted on the same carrier frequency as these transmitting stations and are modulated at a high level with noise signals to substantially blanket the undesired communications. In some of these proposed systems a receiver is provided which is continuously tuned over particular frequency bands so that communications may be continuously detected even though the frequency of transmission is periodically changed. At the same time the transmitter is generally tuned to a frequency somewhat adjacent the center of the slightly varied tuning band of the receiver. After the outside transmitting station has been located then the local transmitter may be more precisely tuned to interfere.

It is an object of my invention to provide an improved frequency comparison and indicating apparatus of the type referred to which may be operated to scan a given band of frequencies and which may also be periodically tuned to a particular fixed frequency.

It is another object of my invention to provide facilities for comparing visually side by side, signals emanating from a local signal source such as the local interference transmitter with signals received from a distance within a given frequency band as well as for a single particular frequency.

It is a further object to compare a local transmitting frequency with that of another station to a high degree of accuracy by restricting the period of observation to a fraction of the tuning cycle.

It is a further object to provide a method and apparatus for comparing two frequencies by relating both to a standard frequency.

Another object of my invention is to provide improved circuits to function in accordance with the objects set forth.

According to my invention, I provide a radio communication interference apparatus comprising a combination of a scanning and tuning receiver, a local signal or noise transmitter with suitable means for generating interference modulation, as well as a cathode ray oscilloscope indicator unit for visual comparison of signals.

The frequency comparing apparatus incorporating the principles of my invention will be described in connection with a specific application, namely that of interference generating equipment which is designed to provide interference with particular outside communication channels after identifying them. In principle, the system operates to first spot and to recognize the transmission of outside stations anywhere within a selected band. The determination of the nominal frequency of the intercepted transmission, is followed by the rapid and accurate setting of the interference transmitter or jammer to the frequency of the outside transmission as determined on the oscilloscope unit by comparing both the jammers and the outside signal frequency with a standard local frequency during a short interval. It is then possible to interfere with such an outside transmission by a suitable noise signal on that frequency. The transmitter is designed to start interfering very quickly and to follow rapidly any frequency changes in the outside transmission. The receiver is arranged to function either as a tuning receiver or as a special combination tuning and scanning receiver which is able to pick up periodically and in sequence external signals as well as those of the jammer or local transmitter. The receiver and the local transmitter are alternately enabled so as to provide for a suitable sequence of transmission, and of reception of the local as well as the outside signal and the observation thereof.

The local transmitter is keyed on and off in proper relation to the receiver which sequentially renders observable on the oscilloscope:

(1) A series of resonance curves representing the external carriers encountered by the receiver during the scanning observation.

(2) A wave shape in the audio frequency range representing the distant or outside signal, when the receiver is fix-tuned for a given interval of time.

(3) A single resonance curve representing the local transmitter pick-up by the receiver during the scanning operation.

(4) A wave shape in the audio frequency range representing the jammer or local transmitter signal.

The above mentioned audio waves are represented by vertical line traces on the oscilloscope for accurate comparison of the distant and the local transmission frequency. The comparison of the two frequencies may be accomplished by a number of methods, which, however, are based on a common principle, as illustrated in the present preferred instance and as already indicated by the spotting of the outside frequency and the immediate, automatic and direct comparison thereof with the local jamming signal with respect to a standard frequency during a given small fraction of an operating cycle.

These and further objects and features of my invention will be better understood from the particular description made with reference to the accompanying drawings in which:

FIG. 1 is a block diagram of a combination circuit embodying the features of my invention;

FIG. 2 is a schematic representation of a portion of the circuit shown in FIG. 1;

FIG. 3 is a set of graphs which serve to explain the operation of the system; and FIG. 4 is a diagrammatic representation of the screen of the cathode ray oscilloscope of FIG. 1 and the comparative traces obtained thereon during the operation of the apparatus.

In FIG. 1, 1 represents a receiver which is continuously scanned over a band of frequencies by any desirable means such as a motor 2. A jamming or local interference transmitter 3 is provided for transmitting signals to jam or interfere with outside or distant communications. In order to detect the presence of outside transmission, there is provided in the output of the receiver 1, a cathode ray oscilloscope indicator 4. The oscilloscope has associated therewith a sweep circuit unit, and also includes a number of circuits for the production of various control and keying pulses, which will be described in detail hereinafter.

The transmitter circuit 3 may be of a standard type suitable to the requirements of the case and will not, therefore, be described in detail. At 5 is indicated a second transmitter which may be an outside signal source and be some distance away. The signal for the transmitter 3 may originate from a noise source, or from a frequency wobbler either of which may be chosen as required. It should be noted, of course, that any other suitable interference signal may be employed in place of the two noise sources mentioned.

The receiver circuit 1 may comprise, as shown, a radio frequency amplifier 6 which is controlled by a keying circuit 7. The amplified radio frequency signal obtained from circuit 6 is beat in the mixer 8 with a locally produced radio frequency signal from an oscillator 9. The intermediate frequency signal from the mixer is amplified in the intermediate frequency amplifier 10 and from here applied to the two circuits branching off therefrom, which are referred to as a scan signal circuit at 11 and a fix-tune signal circuit at 12. The receiver units 6 and 8 are periodically tuned to scan a given frequency band over the first portion of each tuning cycle and then held fix-tuned to a given frequency for the remainder of each of the receiver tuning cycles, the frequency-versus-time relation being illustrated in graph a of FIG. 3. This tuning operation of the receiver may be accomplished in a number of ways, the method chosen herein comprising the use of so-called tuning discs associated with the receiver circuit inductances and driven by the motor 2, the discs serving by means of the configuration of the conducting portions thereof to vary periodically the inductance values of the tuning inductances in the radio frequency amplifier and mixer circuits 6 and 8. A particular fix-tune setting of the frequency of the receiver may be varied by manual control 21 as desired, the tuning of a master oscillator of the transmitter circuit being mechanically ganged to such manual receiver control. The overall radio frequency signal picked up by the receiver 1 and shown at 13 is resolved into two separate signals 14 and 15, respectively representing signals as obtained during the scanning portion and the fix-tune portion of each of the tuning cycles, of the receiver. The speed of the motor 2 is such as to effect, for example, 80 complete scanning and fix-tune operations per second (graph a). The scan signal channel 11 consists of a detector 16 wherein the fix-tune signal 15 is eliminated by an eighty cycle wave obtained from a connection 17, and wherein the scan signal 14 is detected to provide an audio type signal for amplification in an amplifier 18. The amplified audio signal as at 19, corresponding to the original radio frequency scan signal 14 is then applied to the vertical deflection plates of the cathode ray oscilloscope 4, through a connection 20. A 10 cycle per second wave from a connection 22 is applied to a blocking keyer 23 to provide periodical blocking and unblocking potentials to the intermediate frequency portions 8 and 10 of the receiver to render it alternately sensitive and insensitive to low amplitude signals, such as, for instance, those received from distant or other outside transmitters, depending on whether it is desired to receive the locally produced jamming or the distant signals. The jamming signals from the local transmitter 3 are sufficiently strong to overcome such intermediate frequency blocking bias in the receiver 1 so that signals from the jammer may be received and observed while the reception of distant or victim's signal is blocked thereby. It will be understood that the circuit just described for keying the intermediate frequency receiver stage is specific for the condition when there is a local transmitter close by and a second distant transmitter. Other means may be employed if the transmitters do not differ appreciably as to location.

Before describing in further detail the elements constituting the fix-tune signal branch circuit 12, space will be devoted to the description of a number of controlling circuit portions which enable the apparatus to function in a desired sequential order.

A motor 24 is arranged to drive a disc 25 which is suitably shaped and made to pass between the poles of magnetic pick-up 26, whereby a synchronizing pulse wave of the type shown in graph b is supplied for amplification to a synchronizing pulse amplifier 27. Motor 2 may be used in place of motor 24, unless some advantage is gained by using two separate motors and the two are synchronized. The amplified pulse wave from the amplifier 27 is employed to trigger an 80 cycle per second Eccles-Jordan type circuit 28, the 80 cycle pulse wave obtainable therefrom being shown in graph d. The 80 cycle wave, suitably differentiated in turn, is used to trigger a 20 cycle per second multi-vibrator type circuit 29, which, itself may be made to trigger a 10 cycle per second multi-vibrator 30. The rotating disc 25 is also shown provided with a projection 31 which, by passing intermediate the poles of a second pick-up 32 is productive of short 80 cycle pulses of the type shown in graph c. These short pulses are amplified and clipped in a clipper limiter circuit 33 where they attain the shape of the narrow aperture pulses indicated in graph e which are seen to occur during a part of the fix-tune portion of each scanning cycle of graph a.

Following the path of the fix-tune signal circuit hereinabove referred to as 12, the intermediate frequency amplifier 10 is shown connected to supply a limiter circuit 34 with the scan and fix-tune signals 14 and 15, wherein these signals are suitably shaped to assume a constant amplitude as at 35. The intermediate frequency signals, thus limited, are then beat with a heterodyne crystal oscillator frequency wave in a mixer oscillator circuit 36. The audio type scan and fix-tune signals 37 resulting from this circuit 36 are then applied to a so-called audio gate and limiter circuit 38 which may take the usual form of an amplitude limiter for limiting the waves from the output of mixer 36 to produce unidirectional pulses of a constant amplitude. The circuit also includes a gating tube which permits the passage to the output of the circuit of a number of pulses from the received wave occurring within a fixed time limit as determined by the output from clipper limiter 33. The operation of the circuit 38 thus is dependent on the unblocking aperture pulse wave (graph e) which is obtained from the clipper limiter 33, and which is applied for a fraction of the fix-tune portion of the receiver tuning cycle to pass a number of amplitude limited output pulses dependent upon the frequency of the amplitude wave occurring within this gating interval as shown at graph l of FIG. 3. The output of the audio limiter 38 is in the form of a group of audio frequency pulses occurring during the period of each of the aperture pulses of the wave in graph e as shown at 39 in FIG. 1. Each of these groups of pulses is the resultant of the intermediate frequency signals reaching the intermediate frequency limiter 34 and of the beat frequency output of the mixer circuit 36, which, in effect, amounts to a comparison of the signal frequency with a standard locally produced oscillator frequency from circuit 36. These groups of audio pulses are then counted in a so-called cycle counter circuit 40, the detailed operation of which will be discussed in connection with FIG. 2. The cycle counter by means of an integrating condenser serves to build up a stepwise increasing voltage as at 41 (also graph m) the total value of which is proportional to the number of cycles of audio pulses during a given aperture pulse. The counter circuit 40 is cleared at the end of each tuning cycle by a so-called counter discharge voltage obtained from a counter discharge keyer circuit 42 which is triggered from the 80 cycle supply source 28. The step type voltage increases, indicated at 41, are suitably applied to the vertical deflection plates of the cathode ray oscilloscope 4, wherein each of the steps will be observable as a bright dot, as the horizontal deflection voltage is held constant during the building-up period. The number of dots thus visible is an indication of the number of cycles occurring during each of the aperture pulses and is thus a measure of the comparative frequency of the received signal and the standard frequency provided in 36.

The horizontal deflection of the cathode ray oscilloscope is controlled by a horizontal sweep generator 43 which is energized from the 80 cycle source 28 and the deflection voltage of which as a function of time is represented in graph $i$. It will be seen that each horizontal sweep cycle is made up of a straight line sweep in one direction for one-half of the sweep cycle, an abrupt return to an intermediate value in the sweep voltage at the end of the first half of the sweep cycle, while for the remainder of the cycle the horizontal deflection voltage is held constant at the intermediate value. At the beginning of the next cycle, the voltage is reduced again to its initial extreme value to begin its straight line sweep again as before. During the fix-tune portion of the receiver tuning cycle, and coincident with each period when the local jamming transmitter is keyed off, that is during the reception of the outside signal as determined by the 10 cycle per second multi-vibrator 30, a so-called displacing voltage, the wave form of which is shown in graph $h$, is added to the horizontal sweep voltage from a displacing voltage generator 44. On inspecting the sweep wave in graph $i$, it will be noticed that the level of constant voltage portion during cycles 45 and 46 has been increased by a certain amount due to the displacing voltage being added to the horizontal sweep voltage at that point. (The various wave forms are not drawn to scale and represent relative rather than absolute value.) As already indicated, the displacing voltage generator 44 is controlled from the 80 cycle as well as the 10 cycle multi-vibrator circuits 28 and 30 respectively. The cathode ray oscilloscope 4 is periodically enabled at a 20 cycle per second rate by means of the output of an oscilloscope blanking generator 47, which is energized by the horizontal sweep generator 43 and keyed from the 20 cycle source 29. The actual wave form, which is applied to the oscilloscope grid and obtainable from the blanking generator 47 may be observed in graph $k$, which indicates that the oscilloscope is enabled during each of the periods when the receiving circuit is keyed in for outside reception as well as during the periods at the center of the long period when the transmitter is keyed on in accordance with graph $g$. The horizontal sweep generator also produces a retrace blanking wave shown in graph $j$ which when applied together with the 20 cycle per second wave to the blanking generator 47 results in the unblanking wave shape of graph $k$.

Referring now to FIG. 2, the counter circuit 40 is shown to be comprised of an input condenser 48 and an output condenser 49 the capacity of which is a number of times larger than that of 48. A rectifier type diode 50 having its cathode connected to the output side of the condenser 48 and its anode to the input side of the condenser 49 serves to connect the two condensers when the proper voltage conditions prevail. The condenser 48 may be discharged to ground and kept grounded by means of another diode 51, again when the proper voltages are applied thereto. A triode 52, having its cathode connected to the input side of the condenser 49 and its anode to the output side thereof and to ground, serves to provide a discharge path across the condenser 49 when it is rendered conductive by application to its grid of an 80 cycle per second pulse from the source 28. Whenever a pulse of the type shown at 39 is applied to the incoming side of the capacity 48, the resultant change in the steady state voltage condition on condenser 48 will cause to be established a potential on the plate of the diode 51 and the cathode of the tube 50 which is negative with respect to ground. This, in turn will render the diode 51 non-conductive, while diode 50 is enabled to conduct. An equalization of charge is now able to take place between condensers 48 and 49, the potential across condenser 49 changing only a fraction of the voltage of condenser 48, depending on the comparative size of the two. The relative capacities are usually so chosen that the capacity of 49 is many times that of 48. At the end of the first pulse, as the voltage applied to condenser 48 changes back to its original value, the voltage on the cathode of tube 50 rises with respect to ground, tube 51 thereby becoming conductive to ground and discharging condenser 48. Tube 50 at the same time becomes non-conductive. As further pulses are applied to condenser 48, the above voltage and condenser charge changes are repeated except that the voltage on the condenser 49 changes in steps; each step being smaller than the preceding one because of the comparative size of the two condensers, each step adding to the charge already present until the condenser becomes fully charged (or assumes a maximum negative charge) corresponding to the maximum voltage change in the applied audio pulses. However, in this case, there are not enough such pulses occurring during any one aperture cycle to produce this effect.

Since the input side of the condenser 49 is connected to the vertical deflection plates of the cathode ray oscilloscope through connection 53, these stepped increases as well as the total charges on condenser 49 will be observable as vertical deflections, on the oscilloscope screen. Since the horizontal deflection voltage during the building up of the charge on the counter output capacity 49 is being held constant, the duration of each audio pulse will be indicated by a steady bright spot on the oscilloscopic screen. The counter discharge keyer triode 52 will serve to provide an automatic short circuit path to ground across the condenser 49 at the end of the tuning cycle when the 80 cycle control voltage applied to its grid renders the tube sufficiently conductive, whereupon the series of operations described above may be repeated.

By means of a 10 cycle keying voltage shown in graph $g$ and $g_1$, which causes alternately the victim's and the local jamming signal to be observable, the two signals during the fix-tune condition of the receiver will result in two parallel vertically extending line traces 54 and 55 on the oscilloscope screen, as shown in FIG. 4 separated by a distance proportional to the displacing voltage (graph $h$), and indicating by a plurality of luminous dots 56, their respective frequencies as compared to the standard frequency of the heterodyning oscillator 36.

While it is believed that the wave shapes of FIG. 4 are self-explanatory (in view of the above description), it is well to point out that in this instance the 10 cycle keying voltage represented by graph $g$ and $g_1$, is applied to a blocking circuit incorporated in the transmitter 3 and to the radio frequency keyer 7 as well as to the blocking keyer 23 of the receiver apparatus. This 10 cycle voltage serves to cut out the transmitter ⅛ of the time ten times per second in accordance with pulse 57 (graph $g$), while at the same time the receiver is keyed on in accordance with pulse 58 of graph $g_1$. The transmitter is then keyed in for ⅞ of the time, ten times per second, by means of the voltage portion 59 of graph $g$, the receiver conversely being blocked with respect to its radio frequency stages and unblocked in its intermediate frequency stages 8 and 10.

During the blocking cycle, the radio frequency stages of the receiver are effectively blocked off for any signal. At the same time, a high blocking bias is applied to the mixer 8 and the intermediate frequency amplifier 10 so that the sensitivity of the receiver is reduced tremendously and its output becomes comparable with the output when a normal signal is applied to the receiver during normal sensitivity. This enables the receiver to accept a signal from the local transmitter without overloading. Intermediate the two pulses 58 and 57, the 20 cycle per second wave of graph f, by means of the pulse 60 applied to the scope blanking generator 47, enables the control grid of the oscilloscope to permit an observation for a complete scan and fix-tune cycle of the receiver of the local jamming signal frequency in a given frequency band, as well as for a particular frequency. During the pulses 57 or 58 when the transmitter is keyed off and the receiver is keyed in for reception of the enemy signal, the displacing voltage (graph h), when applied together with the horizontal sweep deflection voltage (graph i) to the horizontal deflection plates of the oscilloscope, during the fix-tune portion of the tuning cycle of the receiver, causes the line trace corresponding to the outside signal 55 (FIG. 4) to be displaced toward the right from the center of the screen as seen in FIG. 4. Since the displacing voltage is not being applied during the period when the local transmitter is on and during the time when the jamming signal is observable, that is corresponding to the jammer signal during the pulse 60 (graph f), the line traces corresponding to the jammer signal will appear to the left of center on the oscilloscope screen.

The tuning method hereinabove described in connection with FIGS. 1 and 2 has a number of advantages since it is based on the comparison of the two frequencies involved relative to a standard local frequency. It will be seen that by comparing the two frequencies after their first change to an intermediate frequency with a second audio oscillator beat frequency which is supplying a standard frequency by virtue of a crystal, it is possible to measure the exact value of this audio frequency by such a device as the counter system above described.

In view of the fact that the scanning and tuning portion of the receiver tuning cycle are dependent on a mechanical tuning device, it is not simple to obtain a constant frequency during the fix-tune portion of the cycle, and therefore, the method described hereinabove of comparing the two frequencies during a short, so-called aperture period is of considerable help. It is thus possible to hold variations in the frequency of the receiver during the actual time used for observation to a minimum.

Considering the operation of the scanning circuit 11 in FIG. 1, it is seen that the scanning detector 16 is keyed on in such a manner as to enable it to operate during scanning time and disable it during tuning time so that it will pass signals picked up during the scanning operation only, of the type shown in graph n. This scanning signal is made up of a number of resonance curves for the various frequencies encountered during the sweep across the band with a maximum strength resonance curve for the frequency to which the receiver is tuned at the moment, as shown at 61 in FIG. 4 and in graphs n and o. Since the receiver is ganged for tuning with the local transmitter, the signal of the jammer picked up by the receiver will result in a rather sharp and pointed type of resonance curve, as at 62 in FIG. 4 (also in graph o). The effective deflection signal voltages, both for the scanning and fix-tune periods, as they are being consecutively applied to the vertical deflection plates are shown in graph o. The pulses, causing the deflection voltages having the stepped form corresponding to the number of cycles (as in graph m) and occurring during each aperture period, are shown in graph l.

In order to adjust the jammer to the same frequency as the victim's, in this case, it is therefore only necessary to count the frequency in the manner shown for the two signals, and to ascertain that an equal number of discharges of the counter input condenser have taken place.

By switching electronically, as described, the enemy or the jammer signals on to the counter circuit, the deflections corresponding to the two incoming signals will appear as two substantially vertical traces side by side about ¼" apart. In order to tune to the frequency of the distant transmitter, the receiver is tuned by adjusting the corresponding trace to a desired amplitude for a given frequency or until the number of discharges or bright dots on the screen appear to be of the correct amount.

After the receiver is so adjusted, the transmitter will be tuned in a similar manner by adjusting the corresponding vertical trace on the cathode ray tube to indicate the same number of discharges as the ones which correspond to that of the enemy.

The manner of the electronic switching and keying described in connection with the above illustrated system (FIG. 1) has been designed to accommodate particular circuits for separately detecting the scanning and tuning signals and to separately transmit them to the cathode ray tube for observation. It is obvious, however, that the present method for comparing the frequency of the two signals, lends itself to many other applications.

Accordingly, it is to be understood that while I have described my invention as embodied in particular transmitter and receiver systems, and in connection with a specific application, the principles of my invention are broader than this specific disclosure and may be applied to many other analogous problems not necessarily related to jamming but broadly to frequency comparison as will occur readily to those schooled in the art.

I claim:

1. A radio system for relatively indicating the signal frequency of a first and that of a second signal source within a given band of frequencies, comprising in combination means for receiving radio frequency signals, means for continuously and periodically scanning said receiving means over a predetermined frequency band and for fix-tuning said receiving means to a given frequency for given time intervals, means for producing periodical control keying and aperture pulses concurrent with said time intervals operatively associated with said means for tuning, means for applying said keying pulses to said receiving means rendering it alternately responsive to said first and to said second signal source, first and second circuit means associated with said receiving means for converting respectively the signals received during said scanning and said fix-tune intervals into voltages which are substantially indicative of the response of said receiving means to signals within the given band of frequencies, means for indicating said last named voltages, means for applying in the order received as determined by said keying pulses both said signals for the scanning and fix-tuning intervals to said means for indicating, and means for applying said aperture pulses to said second circuit means, whereby the signal frequencies of said transmitters may be recognized and compared during said aperture pulse.

2. A radio system for relatively indicating the signal frequency of a first and of a second signal within a given band of frequencies, comprising in combination means for receiving radio frequency signals, means for periodically fix-tuning said receiving means to a given frequency for given time intervals, means operatively associated with said means for tuning for producing periodical control pulses during said time intervals, means for applying a portion of said control pulses to said receiving means for rendering it alternately responsive to said first and to said second signal source, circuit means associated with said receiving means for converting the responses at the given frequency of said first and said second source to voltages which are substantially indicative of the respective frequencies, means for beating said two signals with a standard frequency, means for counting the beat frequency cycles of said signals including a cycle counter circuit and a cathode ray oscilloscope, means for applying in the order received, as determined by said control pulses both said signals to said oscilloscope, and means forming a part of said control pulse means for applying a displacing voltage to one of said signals and periodical aperture pulses to both signals whereby the frequencies of said signal sources may be visually compared side by side during each aperture pulse.

3. In a radio system for indicating the signal frequency of two signal sources the combination comprising an intermediate frequency circuit, means for alternately energizing said intermediate frequency circuit from said two sources, a heterodyne oscillator and mixer circuit, means operatively connecting said intermediate frequency circuit and said oscillator mixer circuit, a cycle counting circuit for counting the beat frequency of the output of said mixer circuit, means for generating aperture pulses, and means for operatively connecting said cycle counting circuit and said means for generating aperture pulses, whereby the signal frequencies may be indicated as to the respective number of beat cycles within each aperture pulse.

4. A radio system for relatively indicating the signal frequency of a first and that of a second signal source within a given band of frequencies, comprising in combination, means for receiving radio frequency signals, means for continuously and periodically scanning said receiving means over a predetermined frequency band and for fix-tuning said receiving means to a given frequency for given time intervals, means for producing periodical control keying and aperture pulses concurrent with said time intervals operatively associated with said means for tuning, means for applying said keying pulses to said receiving means rendering it alternately responsive to said first and to said second signal source, first and second circuit means associated with said receiving means for converting respectively the signals received during said scanning and said fix-tune intervals into voltages which are substantially indicative of the response of said receiving means to signals within the given band of frequencies, means for indicating said last named voltages, means for applying in the order received as determined by said keying pulses both said signals for the scanning and fix-tuning intervals to said means for indicating, means for applying said aperture pulses to said second circuit means, whereby the signal frequencies of said transmitters may be recognized and compared during said aperture pulse, said second circuit means including a heterodyne oscillator, a mixer circuit, and a cycle counting circuit, whereby said fix-tune signal frequencies may be indicated with respect to the standard frequency of said heterodyne oscillator during said aperture pulse by observing the beat cycles in said cycle counting circuit.

5. A radio system for relatively indicating the signal frequency of a first and that of a second signal source within a given band of frequencies, comprising in combination, means for receiving radio frequency signals, means for continuously and periodically scanning said receiving means over a predetermined frequency band and for fix-tuning said receiving means to a given frequency for given time intervals, means for producing periodical control keying and aperture pulses concurrent with said time intervals operatively associated with said means for tuning, means for applying said keying pulses to said receiving means rendering it alternately responsive to said first and to said second signal source, first and second circuit means associated with said receiving means for converting respectively the signals received during said scanning and said fix-tune intervals into voltage which are substantially indicative of the response of said receiving means to signals within the given band of frequencies, means for indicating said last named voltages, means for applying in the order received as determined by said keying pulses both said signals for the scanning and fix-tuning intervals to said means for indicating, means for applying said aperture pulses to said second circuit means, whereby the signal frequencies of said transmitters may be recognized and compared during said aperture pulse, said second circuit means includes a heterodyne oscillator and mixer circuit for beating said fix-tune signal frequencies with respect to the standard frequency of said heterodyne oscillator.

References Cited in the file of this patent
UNITED STATES PATENTS

| | | |
|---|---|---|
| 1,917,268 | Mirick | July 11, 1933 |
| 1,944,315 | Clapp | Jan. 23, 1934 |
| 1,966,230 | Andrew | July 10, 1934 |
| 1,982,340 | Forbes | Nov. 27, 1934 |
| 2,076,361 | Beverage | Apr. 6, 1937 |
| 2,178,074 | Jakel et al. | Oct. 31, 1939 |
| 2,189,848 | Wheeler | Feb. 13, 1940 |
| 2,213,886 | Potter | Sept. 3, 1940 |
| 2,252,058 | Bond | Aug. 12, 1941 |
| 2,258,943 | Bedford | Oct. 14, 1941 |
| 2,337,328 | Hathaway | Dec. 21, 1943 |
| 2,367,907 | Wallace | Jan. 23, 1945 |
| 2,412,991 | Labin | Dec. 24, 1946 |

FOREIGN PATENTS

| | | |
|---|---|---|
| 355,705 | Great Britain | Aug. 24, 1931 |
| 506,133 | Great Britain | May 23, 1939 |

OTHER REFERENCES

Electronic Industries, "Panoramic Principles" by W. E. Moulic, July 1944, pp. 86, 87, 88, 206.

Radio, "Panoramic Radio Reception" by J. R. Popkin-Clurman, March 1942, pp. 15–18 and 46–49.

Electrical Review, "Frequency Comparison" by G. F. Freeman, January 7, 1944, pp. 12, 13, 14.